United States Patent
Nolte et al.

(10) Patent No.: US 9,694,777 B2
(45) Date of Patent: Jul. 4, 2017

(54) WHEEL ASSEMBLY ADJUSTMENT FOR VEHICLE EVENTS

(71) Applicant: GM GLOBAL TECHNOLOGY OPERATIONS LLC, Detroit, MI (US)

(72) Inventors: Jason J. Nolte, Wixom, MI (US); Kathryn E. Koski, New Baltimore, MI (US); Sachin K. Pindolia, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 56 days.

(21) Appl. No.: 14/737,126

(22) Filed: Jun. 11, 2015

(65) Prior Publication Data

US 2016/0362079 A1    Dec. 15, 2016

(51) Int. Cl.
*B60R 21/0134* (2006.01)
*G05D 3/10* (2006.01)
*B60W 30/08* (2012.01)
*B60R 21/01* (2006.01)

(52) U.S. Cl.
CPC ......... *B60R 21/0134* (2013.01); *B60W 30/08* (2013.01); *G05D 3/10* (2013.01); *B60R 2021/01252* (2013.01); *B60R 2021/01286* (2013.01)

(58) Field of Classification Search
CPC ...... B60R 21/0134; B60R 2021/01286; B60R 2021/01252; G05D 3/10
See application file for complete search history.

(56) References Cited

U.S. PATENT DOCUMENTS

| 9,327,763 B2 * | 5/2016 | Maier | B62D 9/00 |
| 2015/0084322 A1 * | 3/2015 | Killian | B60B 21/026 280/784 |
| 2015/0239409 A1 * | 8/2015 | Mousa | B62D 49/08 701/45 |

* cited by examiner

*Primary Examiner* — Anne M Antonucci
(74) *Attorney, Agent, or Firm* — Lorenz & Kopf, LLP

(57) ABSTRACT

Methods, systems, and vehicles are provided for controlling an angle of a wheel assembly for vehicle events. In accordance with one embodiment, the vehicle includes a wheel assembly, a structural member, a detection unit, an actuator, and a processor. The detection unit is configured to detect an event for a vehicle that has a wheel assembly. The processor is coupled to the detection unit, and is configured to utilize an actuator to adjust an angle of the wheel assembly in a manner that guides energy absorption or transference from the event toward the structural member.

20 Claims, 3 Drawing Sheets

WHEEL ASSEMBLY ADJUSTMENT FOR VEHICLE EVENTS

TECHNICAL FIELD

The present disclosure generally relates to the field of vehicles and, more specifically, to methods and systems for adjusting wheel assemblies for vehicles during or in anticipation of vehicle events.

BACKGROUND

Many vehicles today, such as automobiles, have various features for vehicle events. Such features may include avoidance systems such as automatic braking, obstacle detection, and warning systems (among others) as well as mitigation systems such as crumple zones, seat belts, and airbags (among others).

It is desirable to provide improved methods for vehicle events, including mitigation of events. It is also desirable to provide systems for vehicle events, and to provide vehicles that include such methods and systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method includes the steps of detect, using a detection unit, an event for a vehicle that has a wheel assembly; and adjusting, via instructions provided from a processor, an angle of the wheel assembly in a manner that guides energy absorption or transference from the event.

In accordance with an exemplary embodiment, a system is provided. The system includes a detection unit and a processor. The detection unit is configured to detect an event for a vehicle having a wheel assembly. The processor is coupled to the detection unit, and is configured to adjust an angle of the wheel assembly in a manner that guides energy absorption or transference from the event.

In accordance with a further exemplary embodiment, a vehicle is provided. The vehicle includes a wheel assembly, a structural member, a detection unit, and a processor. The detection unit is configured to detect an event for a vehicle that has a wheel assembly. The processor is coupled to the detection unit, and is configured to adjust an angle of the wheel assembly in a manner that guides energy absorption or transference from the event toward the structural member.

DRAWINGS

The present disclosure will hereinafter be described in conjunction with the following drawing figures, wherein like numerals denote like elements, and wherein.

Figure 1:
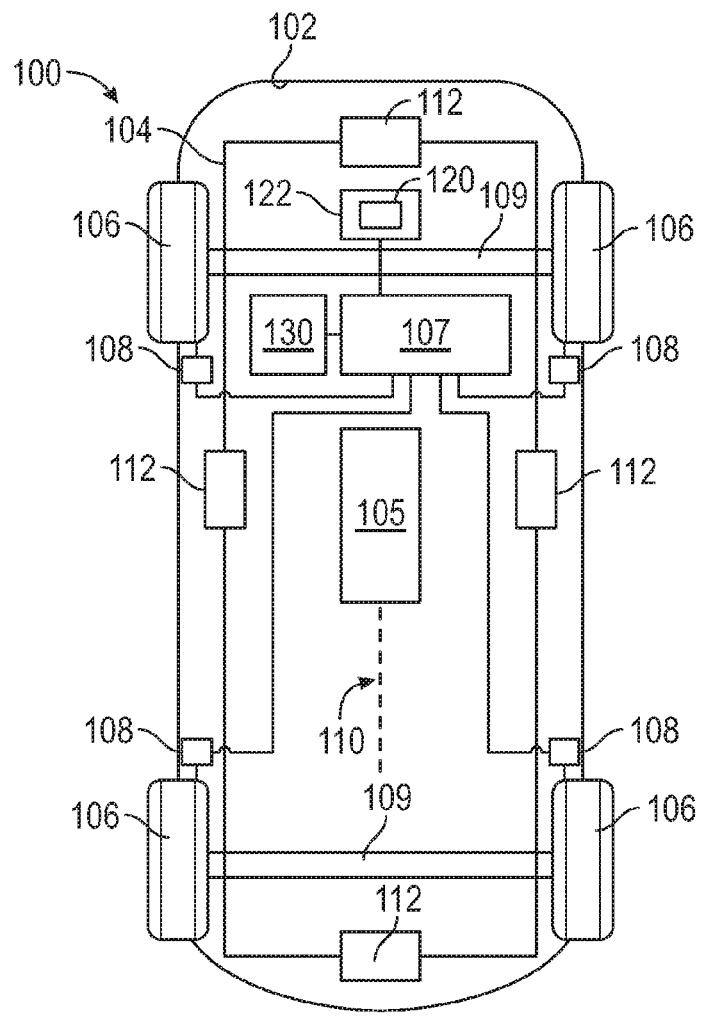
FIG. 1 is a functional block diagram of a vehicle that includes a wheel assembly and a control system for controlling an angle of the wheel assembly for a vehicle event, in accordance with an exemplary embodiment.
Figure 2:
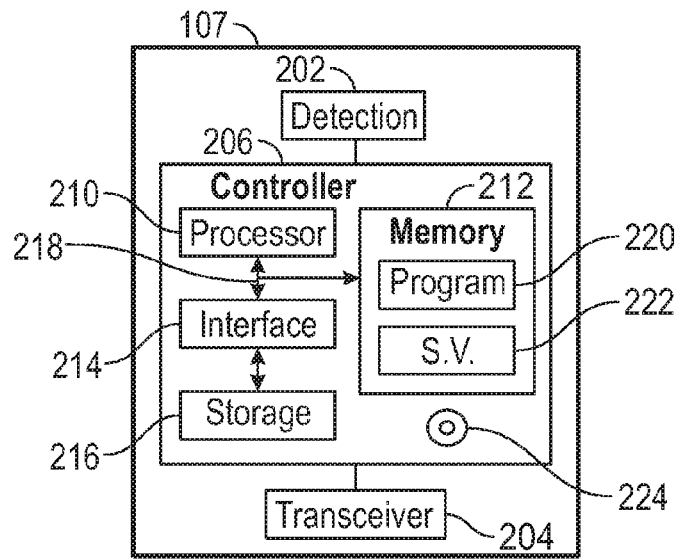
FIG. 2 is a functional block diagram of a control system that can be used in connection with the vehicle of FIG. 1, in accordance with an exemplary embodiment.
Figure 3:
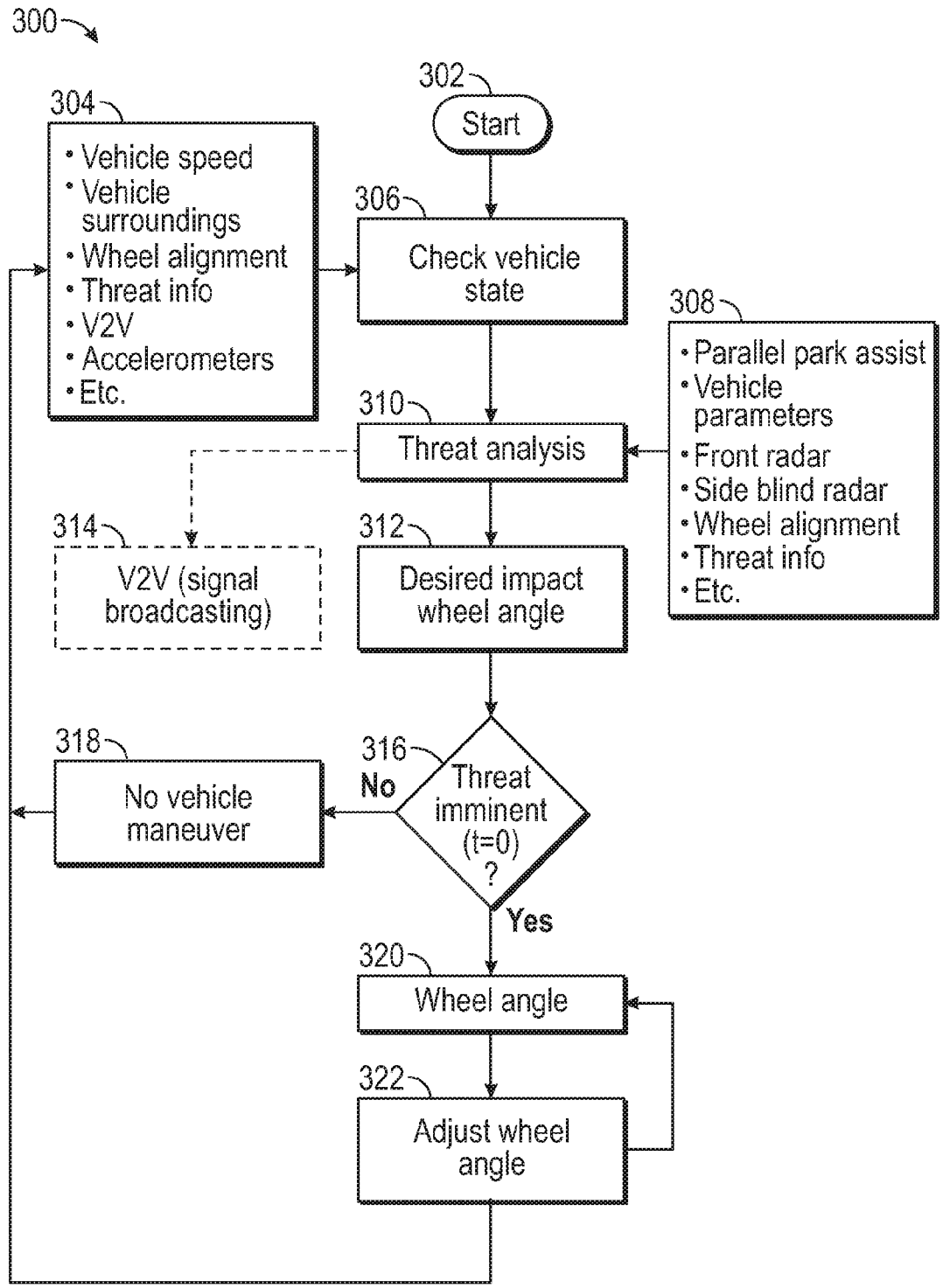
Figure 4:
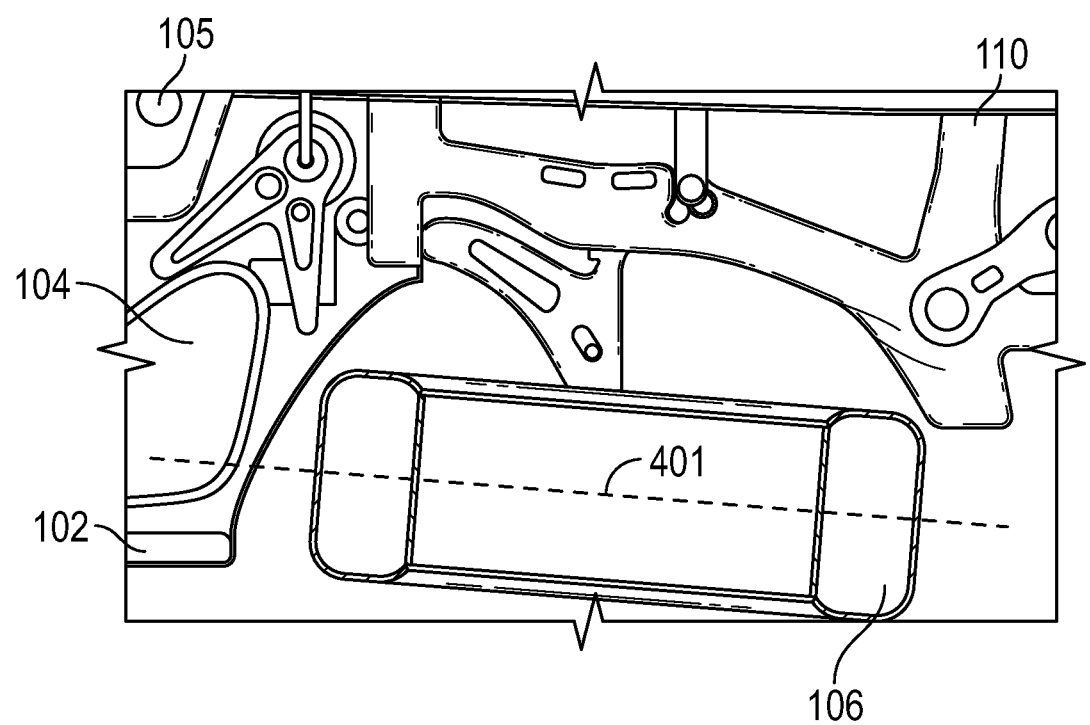

FIG. 3 is a flowchart of a process for controlling an angle of the wheel assembly for a vehicle event, and that can be used in connection with the vehicle of FIG. 1, the wheel assembly of FIG. 1, and the control system of FIGS. 1 and 2, in accordance with an exemplary embodiment; and FIG. 4 provides an illustrative example of the controlling of the angle of the wheel assembly for the process of FIG. 3, in accordance with an exemplary embodiment.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV). In certain embodiments the vehicle 100 may be two-wheel drive (2WD) (i.e., rear-wheel drive or front-wheel drive), four-wheel drive (4WD), or all-wheel drive (AWD) (or in certain embodiments, the vehicle 100 may include any number of wheels, or a single wheel). Also in certain embodiments, the vehicle 100 may be in motion or not in motion.

As described in greater detail further below, the vehicle 100 includes a body 102, a structural member 104, a passenger compartment 105, a wheel assembly 106, and a control system 107. The control system 107 provides for angular adjustment of the wheel assembly 106 and/or components thereof (e.g. wheels) for a vehicle event. In accordance with one embodiment, the control system 107 can angularly adjust wheels of the wheel assemblies 106 individually and as a unit. In addition, in one embodiment, during a vehicle event, the control system 107 rotates the wheel assembly 106 using one or more actuators 108 coupled (directly or indirectly) to the wheel assembly 106 in a manner that directs energy absorption from the event toward the structural member 104 and away from the passenger compartment 105. Also in one embodiment, each wheel may have a different desired wheel angle, and the control system is configured to adjust each wheel individually in addition to adjustment as part of a unit.

In one embodiment, the body 102 is arranged on a chassis (not depicted), and substantially encloses the other components of the vehicle 100. The body 102 and the chassis 110 may jointly form a frame.

The wheel assembly 106 refers, collectively, to a wheel and any accompanying parts (e.g. a tire). While four wheel assemblies 106 (or wheels) are depicted in the exemplary embodiment of FIG. 1, it will be appreciated that in various embodiments the vehicle may include any number of wheel assemblies 106 (or wheels). In one embodiment, the wheel assemblies 106 are coupled to one or more drive shafts (also referred to herein as axles) 109 as well as the above-mentioned actuators 108. However, this may vary in certain embodiments. For example, in certain embodiments, the vehicle 100 may be non-driven. As used herein, the terms "wheel assembly" and "wheel assemblies" may be used interchangeable (for example, if there is a discussion that an action is taken with respect to a "wheel assembly", it will be understand that such action may be taken with respect to multiple "wheel assemblies" of the vehicle 100).

The structural member 104 absorbs energy during a vehicle event, including an event in which the vehicle 100 contacts another vehicle or object. In one embodiment, the structural member comprises a structural rail that may be coupled to various absorption units 112 that absorb energy during impact of a vehicle event. In certain embodiments, the absorption units 112 include one or more cradles, absorption boxes, crumple zones, and/or other energy absorption devices.

In one embodiment, the vehicle 100 includes one or more propulsion systems 120. In one embodiment, the propulsion systems are mounted on the chassis 110, and are housed in one or more respective housings 122 (e.g. cradles or casings). Also in one embodiment, the propulsion systems 120 are integrated such that they are mechanically coupled to the wheel assembly 106 through the axles 109. However, in various other embodiments, one or more axle-less propulsion systems may be used (e.g., a drive motor disposed inside one or more wheels 106). In certain embodiments, the propulsion systems 120 comprise one or more vehicle motors, engines (e.g., combustion and/or electric) and/or energy storage systems (e.g. batteries), among also possible propulsion system components. The vehicle 100 may incorporate any one of, or combination of, a number of different types of propulsion systems 120, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

As depicted in FIG. 1, the vehicle 100 also includes one or more other vehicle systems 130. In various embodiments, such other vehicle systems 130 may include, among others, a steering system, a braking system, an engine control system, an electric control system, a parallel park assist system, a telematics system, an active safety control system, and/or one or more other systems. In certain embodiments, such other vehicle systems 130 may be part of the control system 107, and/or may be coupled to the control system 107. In various embodiments, the other vehicle systems 130 are mounted on the chassis 110.

As noted above, the control system 107 provides for angular adjustment of the wheel assembly 106 for a vehicle event, and in one embodiment angles the wheel assembly 106 using the one or more actuators 108 coupled to the wheel assembly 106 in a manner that directs energy absorption from the event toward the structural member 104 and away from or around the passenger compartment 105 during a vehicle event. The axles 109 cause rotation of the wheel assembly 106, directly or indirectly, via instructions provided by the control system 107. In certain embodiments, the actuators 108 are coupled between the control system 107 and the wheel assembly 106, and cause direct rotation of the wheel assembly 106. In certain embodiments, the actuators 108 are coupled to one or more of the axles 109, and cause rotation of the wheel assembly 106 at least in part based on movement of the axles 109. In certain other embodiments, angling of the wheel assembly 106 may occur regardless of whether drive shafts are present in the vehicle 100 and/or regardless of whether the vehicle 100 is driven or non-driven. In certain embodiments, a single wheel may be articulated independent of or in conjunction with any other wheel on the vehicle. While the actuators 108 are depicted in FIG. 1 as being separate from the control system 107, it will be appreciated that in various embodiments the actuators 108 may be considered as part of the control system 107. In various embodiments, the control system 107 includes various components as described below in connection with FIG. 2, and provides this functionality in accordance with the steps of the process 300 discussed further below in connection with FIGS. 3 and 4.

With reference to FIG. 2, a functional block diagram is provided for the control system 107 of FIG. 1, in accordance with an exemplary embodiment. As depicted in FIG. 2, the control system 107 includes a detection unit 202, a transceiver 204, and a controller 206. In one embodiment, each of the detection unit 202, transceiver 204, and controller 206 are disposed onboard the vehicle 100.

The detection unit 202 includes one or more sensors and/or other devices for detecting a vehicle event as well as for detecting data pertaining to a vehicle state and environmental conditions pertaining to the vehicle 100. In one embodiment, the detection unit 202 includes one or more sensors and/or other devices for detecting an imminent vehicle event in which the vehicle 100 is about to contact another vehicle or object. In various embodiments, such sensors and/or devices may include one or more cameras, radar units, lidar units, sonar units, lasers, ultrasound units, and/or any number of other types of sensors and/or other devices.

Also in one embodiment, the detection unit 202 includes one or more sensors and/or other devices for detecting, as it occurs or after it has begun, a vehicle event in which the vehicle 100 is in the process of contacting another vehicle or object. In various embodiments, such sensors and/or devices may include frontal, side, and/or rear impact sensors, and/or any number of other types of sensors and/or devices.

In addition, in one embodiment, the detection unit 202 includes one or more sensors and/or other devices for obtaining values of parameters pertaining to the state of the vehicle 100 and environmental conditions surrounding the vehicle 100. These may include, for example, vehicle accelerometers, wheel speed sensors, wheel alignment sensors, temperature sensors, moisture sensors, light sensors, tire pressure sensors, and/or any number of other types of sensors and/or other devices. In certain embodiments, these readings are compiled and continuously updated to provide the detection unit 202 the most up to date and pertinent information.

In certain embodiments, the transceiver 204 obtains data from one or more other systems or devices. In one example, the transceiver 204 obtains data from values of parameters pertaining to the state of the vehicle 100 and environmental conditions surrounding the vehicle 100 from the detection unit 202. Also in certain embodiments, the transceiver 204 obtains data from values of parameters pertaining to the state of the vehicle 100 and environmental conditions surrounding the vehicle 100 from one or more devices and/or systems off-board the vehicle 100, such as from a remote server, one or more other vehicles, and/or one or more objects (e.g. a "smart bridge", a "smart post", and/or one or more other objects having communication capabilities). In addition, in certain embodiments, the transceiver 204 communicates information pertaining to the vehicle 100, an identified vehicle event, and/or one or more courses of action (e.g. airbag deployment, wheel assembly adjustment, or the like) to such other vehicles or objects.

The controller 206 is coupled to the detection unit 202 and to the transceiver 204, and is also coupled directly or indirectly to the wheel assembly 106 of FIG. 1. The controller 206 processes the data and information received from the detection unit 202 and the transceiver 204, directs communications of the transceiver 204, determines optimal adjustments for an angle of the wheel assembly 106 of FIG. 1 for a vehicle event, and implements the adjustments via instructions (for example, as provided to the actuators 108 and/or axles 109 of FIG. 1). The controller 206 provides such functions in accordance with the process 300 described further below in connection with FIGS. 3 and 4, in accordance with an exemplary embodiment.

As depicted in FIG. 2, the controller 206 comprises an onboard computer system. In certain embodiments, the controller 206 may also include and/or be part of one or more of the detection unit 202 and/or the transceiver 204 of FIG. 2, the actuators 108 of FIG. 1, and/or one or more other vehicle components. In addition, it will be appreciated that the controller 206 may otherwise differ from the embodiment depicted in FIG. 2. For example, the controller 206 may be coupled to or may otherwise utilize one or more remote computer systems and/or other control systems.

In the depicted embodiment, the computer system of the controller 206 includes a processor 210, a memory 212, an interface 214, a storage device 216, and a bus 218. The processor 210 performs the computation and control functions of the controller 206, and may comprise any type of processor or multiple processors, single integrated circuits such as a microprocessor, or any suitable number of integrated circuit devices and/or circuit boards working in cooperation to accomplish the functions of a processing unit. During operation, the processor 210 executes one or more programs 220 contained within the memory 212 and, as such, controls the general operation of the controller 206 and the computer system of the controller 206, preferably in executing the steps of the processes described herein, such as the steps of the process 300 in connection with FIGS. 3 and 4. The processor 210, along with the other components of the controller 206, is preferably disposed onboard the vehicle 100.

The memory 212 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 212 is located on and/or co-located on the same computer chip as the processor 210. In the depicted embodiment, the memory 212 stores the above-referenced program 220 along with one or more stored values 222 (for example, threshold values for determining whether a threat is imminent).

The bus 218 serves to transmit programs, data, status and other information or signals between the various components of the computer system of the controller 206. The interface 214 allows communication to the computer system of the controller 206, for example from a system driver and/or another computer system, and can be implemented using any suitable method and apparatus. It can include one or more network interfaces to communicate with other systems or components. The interface 214 may also include one or more network interfaces to communicate with technicians, and/or one or more storage interfaces to connect to storage apparatuses, such as the storage device 216.

The storage device 216 can be any suitable type of storage apparatus, including direct access storage devices such as hard disk drives, flash systems, floppy disk drives and optical disk drives. In one exemplary embodiment, the storage device 216 comprises a program product from which memory 212 can receive a program 220 that executes one or more embodiments of one or more processes of the present disclosure, such as the steps of the process 300 of FIGS. 3 and 4, described further below. In another exemplary embodiment, the program product may be directly stored in and/or otherwise accessed by the memory 212 and/or a disk (e.g., disk 224), such as that referenced below.

The bus 218 can be any suitable physical or logical means of connecting computer systems and components. This includes, but is not limited to, direct hard-wired connections, fiber optics, and infrared and wireless bus technologies. During operation, the program 220 is stored in the memory 212 and executed by the processor 210.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 210) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 206 may also otherwise differ from the embodiment depicted in FIG. 2, for example in that the computer system of the controller 206 may be coupled to or may otherwise utilize one or more remote computer systems and/or other control systems.

FIG. 3 is a flowchart of a process 300 for controlling an angle of the wheel assembly for a vehicle event, in accordance with an exemplary embodiment. The process 300 can be used in connection with the vehicle 100 of FIG. 1, the wheel assembly 106 of FIG. 1, and the control system 107 of FIGS. 1 and 2, in accordance with an exemplary embodiment.

The process 300 beings at step 302. In one embodiment, the process 300 begins once a vehicle drive has begun (e.g. once an ignition of the vehicle has started, or the vehicle has otherwise been placed in a driving mode). The process 300 preferably repeats, most preferably continuously, throughout the vehicle drive cycle.

Various inputs are obtained (step 304). In one embodiment, in step 304 various inputs are obtained pertaining to a vehicle state and environmental conditions surrounding the vehicle. In various embodiments, the inputs include the following: a vehicle speed (e.g. as obtained via an accelerometer or as calculated from values from wheel speed sensors); a vehicle acceleration (e.g. as obtained via an accelerometer of the vehicle 100); data pertaining to vehicle surroundings (e.g. temperature, precipitation, winds, and other weather conditions, along with conditions of the roadway, traffic conditions, the time of day, and the like) which can be gathered by onboard sensors or via an internet connection and/or outside sources; wheel alignment data (e.g. from wheel sensors); vehicle to vehicle information (e.g. information received from nearby vehicles that may be approaching or about to contact the vehicle 100); and object to vehicle and/or vehicle to object communications (e.g. from or to a "smart object", such as a "smart bridge" or "smart post", or the like, with communication capabilities that might be near or about to contact the vehicle 100). In certain embodiments, various inputs of step 304 are obtained by the controller 206 via various sensors and devices of the detection unit 202 of FIG. 2 and/or from one or more other devices or systems via the transceiver 204 of FIG. 2, and provided to the processor 210 of FIG. 2 for processing. In certain embodiments, one or more steering wheel sensors, brake pedal position sensors, accelerator pedal position sensors, occupant seat detection sensors, and occupant position and/or movement sensors are utilized. In certain embodiments, occupant action is also taken into account. In addition, in certain embodiments, the sensors also take into account the shape and size of the vehicle as it pertains to any objects and/or threats that may be proximate and/or detected with respect to the vehicle.

The inputs of step 304 are utilized in determining a state of the vehicle (step 306). As referenced herein, the state of the vehicle represents an overall assessment of various status attributes of the vehicle and its surroundings that could play a role in a vehicle event, and for example that could affect energy absorption or distribution during a vehicle event. In one embodiment, the vehicle state is determined by the processor 210 of FIG. 2.

In addition, various additional inputs are obtained (step 308). In one embodiment, in step 308 various inputs are obtained pertaining to a possible vehicle event. In various embodiments, the inputs of step 308 include the following: parallel park assist data (for example, a proximity to other vehicles or objects near the vehicle 100 during parallel parking, as obtained from a parallel park assist system); vehicle parameters (e.g. parameters similar to these set forth in step 304); detection data from nearby vehicles or objects (e.g., as obtained from front radar, side blind radar, other radar, lidar, sonar, camera, laser, ultrasound, and/or other devices); wheel alignment data (e.g., similar to that of step 304); and other possible threat information (e.g. regarding detect vehicles or objects, communications from other vehicles or objects, or other threat information, and the like). In certain embodiments, various inputs of step 306 are obtained by the controller 206 via various sensors and devices of the detection unit 202 of FIG. 2 and/or from one or more other devices or systems via the transceiver 204 of FIG. 2, and provided to the processor 210 of FIG. 2 for processing.

A threat analysis is performed (step 310). In one embodiment, the threat analysis pertains to a possible event for the vehicle 100, such as a possible impact with another vehicle or object. In one embodiment, the type of event is identified. In addition, in certain embodiments, a probability or likelihood of occurrence is also determined. Also in one embodiment, the threat analysis is performed by the processor 210 of FIG. 2 using the various inputs of step 308, as well as the inputs of step 304 and the vehicle state of step 306. In one embodiment, the threat analysis may assess all or a prioritized subset of possible threats from vehicle surroundings. In addition, in one embodiment, while making the threat analysis the threat analysis, the process keeps track of the most dangerous and most likely threats, for example to allows the analysis to determine the threat and not maneuver into another threat.

A desired angle is determined for the wheel assembly for the event (step 312). In one embodiment, the desired angle represents a desired angle for the wheel assembly 106 of FIG. 1 for the event, for example that provides an optimal or preferred distribution or absorption from the event if the event were to occur. In one embodiment, this determination is made in view of the type of event identified in step 310, as well as the vehicle state of step 306 and the inputs of steps 304 and 308. Also in one embodiment, this determination is made by the processor 210 of FIG. 2 as part of, or in follow-up to, the threat assessment of step 310. In one embodiment, the desired wheel angle is selected based on any imminent threats and surrounding conditions. In various embodiments, the angle determination may be predictive or reactionary based on the threat analysis of step 310. In certain embodiments, the angle is retrieved from a look-up table or calculated from an equation in the controller 206. In certain embodiments, the angles could be self-adjusting based on vehicle and/or environmental parameters and/or states. In certain embodiments, this may be achieved by directly skewing equation factors or by an additional scaling of the output from predetermined values and/or equations. In addition, in certain embodiments, if an avoidance maneuver is not possible, but a threat is detected then, there is a determination that there is a high likelihood of an imminent threat.

In addition, in certain embodiments, information pertaining to the threat analysis (e.g. an identification of the type of event) is provided to one or more other vehicles or objects (step 314). For example, in certain embodiments, such information may be provided to other vehicles or objects (e.g. "smart bridges", "smart posts", or other "smart" objects with communication capabilities) as a warning, and/or to allow the other vehicles or objects to take measures to help prevent the event from occurring and/or to help mitigate the event. In one embodiment, such communications are provided via the transceiver 204 of FIG. 2 in accordance with instructions provided by the processor 210 of FIG. 2.

A determination is made as to whether the event is imminent (step 316). In one embodiment, step 316 includes a determination as to whether an event (e.g. an impact with another vehicle or object) identified in step 310 is about to occur (for example, if the time to impact is less than a predetermined threshold for an impact event). In one embodiment, the predetermined threshold may be approximately equal to one hundred milliseconds (100 ms). However, this may vary in other embodiments. In one event, an event is determined to be imminent if a customer override or input is received (for example, if a driver, passenger, or other customer presses a button or otherwise provides an instruction to implement the angle adjustment of step 320 below).

In certain embodiments, if it is determined in step 316 that an event is not imminent, then no action is taken with respect to the wheel assembly (step 318). In one embodiment, the process continues with new iterations of steps 304-316 (including new, updated inputs and determinations) until and unless a determination is made in step 316 that an event is imminent.

Conversely, if it is determined in step 316 that an event is imminent, then a command is provided to adjust the angle of the wheel assembly (step 320). In one embodiment, this command is provided by the processor 210 of FIG. 2 to the actuators 108 of FIG. 1 for rotation of the wheel assembly 106 of FIG. in order to reach the desired angle determined in step 312. The command is then executed accordingly to rotate the wheels to reach the desired angle (step 322). In one embodiment, other event actions are also taken (for example, deployment of airbags, notification of authorities, and the like). Also in one embodiment, the process continues with additional inputs and determinations to determine, for example, whether additional actions may be necessary or appropriate.

FIG. 4 provides an illustrative example of the controlling of the angle of the wheel assembly for the process 300 of FIG. 3, in accordance with an exemplary embodiment. In the embodiment depicted in FIG. 4, a rear portion of a front wheel assembly 106 is rotated inward toward the structural member 104 of the vehicle 100 (e.g. toward a center of the vehicle 100) so as to align with the structural member 104 (e.g. a structure rail). In this example, the wheel assembly 106 is aligned with the structure rail, and therefore may be able to effectively guide energy from the impact of the event to the structural member 104 and away from the passenger compartment 105 of FIG. 1 (for example, as shown in FIG. 4, in one embodiment, a central axis 401 of the depicted wheel 106 is aligned toward the structural member, e.g. the structural rail).

Accordingly, methods and systems, and vehicles are provided for controlling an angle of the wheel assembly of a vehicle for vehicle events. For example, in certain embodiments, the wheel assembly is rotated in a manner so as to align with the member and therefore distribute the energy absorption to the structural member as desired.

It will be appreciated that the disclosed methods, systems, and vehicles may vary from those depicted in the Figures and described herein. For example, the vehicle 100, the wheel assembly 106, the control system 107, and/or various components thereof may vary from that depicted in FIGS. 1 and 2 and described in connection therewith. In addition, it will be appreciated that certain steps of the process 300 may vary from those depicted in FIGS. 3 and 4 and/or described above in connection therewith. It will similarly be appreciated that certain steps of the process described above (and/or sub-processes or sub-steps thereof) may occur simultaneously or in a different order than that depicted in FIGS. 3 and 4 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method comprising:
    detecting, using a detection unit comprising one or more sensors, an event for a vehicle that has a wheel assembly, wherein the event comprises an imminent contact event in which the vehicle impacts another vehicle or object; and
    adjusting, via instructions provided from a processor, an angle of the wheel assembly in a manner that guides energy absorption or transference from the impact of the vehicle with the other vehicle or object.

2. The method of claim 1, further comprising:
    obtaining one or more parameters pertaining to a state of the vehicle; and
    determining an optimal angle for the wheel assembly adjustment based on the event and the one or more parameters.

3. The method of claim 1, wherein:
    the step of detecting the event comprises detecting an imminent contact event in which the vehicle is likely to impact another vehicle; and
    the step of adjusting the angle comprises adjusting the angle via one or more actuators that are coupled to the processor and configured to implement instructions from the processor to adjust the angle after an imminent contact event is determined in which the vehicle is likely to impact another vehicle, such that the adjustment of the angle of the wheel assembly is performed in a manner that guides energy absorption or transference from the impact of the vehicle with the other vehicle.

4. The method of claim 1, wherein:
    the step of adjusting the angle comprises, adjusting, via instructions provided from the processor, the angle of the wheel assembly in a manner that guides energy absorption from the event toward a structural member of the vehicle.

5. The method of claim 4, wherein:
    the step of adjusting the angle comprises, adjusting, via instructions provided from the processor, the angle of the wheel assembly in a manner that aligns the wheel assembly with the structural member.

6. The method of claim 5, wherein:
    the structural rail comprises a structural rail for the vehicle; and
    the step of adjusting the angle comprises, adjusting, via instructions provided from the processor, the angle of the wheel assembly in a manner that aligns a portion of the wheel assembly with the structural rail.

7. The method of claim 1, wherein:
    the step of detecting the event comprises detecting the event based on receiving a customer override or input; and
    the step of adjusting the angle comprises adjusting the angle after the customer override or input is received.

8. A system comprising:
    a detection unit comprising one or more sensors configured to detect an event for a vehicle that has a wheel assembly, wherein the event comprises an imminent contact event in which the vehicle impacts another vehicle or object; and
    a processor coupled to the detection unit and configured to adjust an angle of the wheel assembly in a manner that guides energy absorption or transference from the impact of the vehicle with the other vehicle or object.

9. The system of claim 8, wherein:
    the detection unit is configured to obtain one or more parameters pertaining to a state of the vehicle; and
    the processor is configured to determine an optimal angle for the wheel assembly adjustment based on the event and the one or more parameters.

10. The system of claim 8, wherein:
    the detection unit is configured to determine an imminent contact event in which the vehicle is likely to impact another vehicle; and
    the processor is configured to adjust the angle of the wheel assembly in a manner that guides energy absorption or transference from the impact of the vehicle with the other vehicle.

11. The system of claim 10, further comprising:
    one or more actuators that are coupled to the processor, the one or more actuators configured to adjust the angle by implementing instructions provided by the processor after an imminent contact event is detected.

12. The system of claim 8, wherein:
    the processor is configured to adjust the angle of the wheel assembly in a manner that guides energy absorption from the impact toward a structural member of the vehicle.

13. The system of claim 12, wherein:
    the processor is configured to adjust the angle of the wheel assembly in a manner that aligns the wheel assembly with the structural member.

14. The system of claim 13, wherein:
the structural rail comprises a structural rail for the vehicle; and
the processor is configured to adjust the angle of the wheel assembly in a manner that aligns a portion of the wheel assembly with the structural rail.

15. A vehicle comprising:
a wheel assembly;
a structural member;
a detection unit comprising one or more sensors configured to detect an event for a vehicle that has a wheel assembly, wherein the event comprises an imminent contact event in which the vehicle impacts another vehicle or object; and
a processor coupled to the detection unit and configured to adjust an angle of the wheel assembly in a manner that guides energy absorption or transference from the impact of the vehicle with the other vehicle or object toward the structural member.

16. The vehicle of claim 15, wherein:
the detection unit is configured to obtain one or more parameters pertaining to a state of the vehicle; and
the processor is configured to determine an optimal angle for the wheel assembly adjustment based on the event and the one or more parameters.

17. The vehicle of claim 15, wherein:
the detection unit is configured to detect an imminent contact event in which the vehicle is likely to impact another vehicle; and
the processor is configured to adjust the angle of the wheel assembly in a manner that guides energy absorption or transference from the impact of the vehicle with the other vehicle.

18. The vehicle of claim 15, wherein:
the processor is configured to adjust the angle of the wheel assembly in a manner that aligns the wheel assembly with the structural member.

19. The vehicle of claim 18, wherein:
the structural rail comprises a structural rail for the vehicle; and
the processor is configured to adjust the angle of the wheel assembly in a manner that aligns a portion of the wheel assembly with the structural rail.

20. The vehicle of claim 15, further comprising:
one or more actuators coupled between the processor and the wheel assembly, the one or more actuators configured to implement instructions from the processor to adjust the angle of the wheel assembly.

* * * * *